(12) United States Patent
Dannoux et al.

(10) Patent No.: US 12,259,584 B2
(45) Date of Patent: Mar. 25, 2025

(54) MULTI-FIBER CONNECTOR AND FABRICATION METHOD

(71) Applicant: CORNING RESEARCH & DEVELOPMENT CORPORATION, Corning, NY (US)

(72) Inventors: Thierry Luc Alain Dannoux, Avon (FR); Riley Saunders Freeland, Corning, NY (US)

(73) Assignee: Corning Research & Development Corporation, Corning, NY (US)

( * ) Notice: Subject to any disclaimer, the term of this patent is extended or adjusted under 35 U.S.C. 154(b) by 173 days.

(21) Appl. No.: 17/979,229

(22) Filed: Nov. 2, 2022

(65) Prior Publication Data

US 2023/0168442 A1 Jun. 1, 2023

Related U.S. Application Data

(60) Provisional application No. 63/284,098, filed on Nov. 30, 2021.

(51) Int. Cl.
G02B 6/38 (2006.01)

(52) U.S. Cl.
CPC ......... *G02B 6/3885* (2013.01); *G02B 6/3825* (2013.01); *G02B 6/3861* (2013.01); *G02B 6/3897* (2013.01)

(58) Field of Classification Search
None
See application file for complete search history.

(56) References Cited

U.S. PATENT DOCUMENTS

| | | | |
|---|---|---|---|
| 4,830,456 A | 5/1989 | Kakii et al. | |
| 4,973,127 A | 11/1990 | Cannon et al. | |
| 5,664,039 A | 9/1997 | Grinderslev et al. | |
| 6,062,740 A * | 5/2000 | Ohtsuka | G02B 6/3865 385/83 |
| 2002/0104331 A1 * | 8/2002 | Fukuyama | C03C 19/00 65/61 |
| 2002/0186954 A1 * | 12/2002 | Liu | G02B 6/3636 385/83 |

(Continued)

FOREIGN PATENT DOCUMENTS

| | | |
|---|---|---|
| EP | 0271721 A2 | 6/1988 |
| WO | 2002/056078 A1 | 7/2002 |

(Continued)

*Primary Examiner* — Jerry Rahll

(57) ABSTRACT

An optical fiber connector comprises a multi-fiber ferrule having an array of grooves recessed relative to an upper surface of a medial portion thereof, wherein each groove has a depth greater than a maximum diameter of an uncoated fiber segment received therein, and is shaped such that an optical fiber received therein lacks contact with the groove over large arc length thereof (e.g., an arc spanning at least 120 or at least 150 degrees). A method for fabricating a multi-fiber connector with a multi-fiber ferrule includes flexing a medial portion of the ferrule into a non-linear configuration to expand an average width of at least some grooves defined in an upper surface of a medial portion thereof, receiving optical fibers in the grooves, pushing the fibers away from the bottom of each groove, and securing the optical fibers in the grooves.

20 Claims, 10 Drawing Sheets

(56) References Cited

U.S. PATENT DOCUMENTS

| | | | | |
|---|---|---|---|---|
| 2005/0129380 A1* | 6/2005 | Takeuchi | ............ | C03C 10/0027 385/137 |
| 2006/0051045 A1* | 3/2006 | Qiu | ...................... | G02B 6/3839 385/137 |
| 2012/0257860 A1* | 10/2012 | Li | ........................ | G02B 6/3885 385/83 |
| 2013/0266271 A1* | 10/2013 | Li | ........................ | G02B 6/3882 385/83 |
| 2014/0010499 A1* | 1/2014 | Suematsu | ............ | G02B 6/3885 385/65 |
| 2014/0191427 A1* | 7/2014 | Anderson | ............ | G02B 6/3843 264/1.25 |
| 2016/0216455 A1* | 7/2016 | Huang | ................. | G02B 6/3885 |
| 2016/0252683 A1* | 9/2016 | Sasaki | ................. | G02B 6/3843 385/78 |
| 2021/0132303 A1* | 5/2021 | Nishimura | ............. | G02B 6/406 |
| 2023/0251434 A1* | 8/2023 | Yakabe | ................ | G02B 6/3881 385/79 |

FOREIGN PATENT DOCUMENTS

| | | |
|---|---|---|
| WO | 2002/088789 A1 | 11/2002 |
| WO | 2013/151583 A1 | 10/2013 |

* cited by examiner

MULTI-FIBER CONNECTOR AND FABRICATION METHOD

PRIORITY APPLICATION

This application claims the benefit of priority of U.S. Provisional Application No. 63/284,098, filed on Nov. 30, 2021, the content of which is relied upon and incorporated herein by reference in its entirety.

BACKGROUND

This disclosure relates generally to optical fibers, and more particularly to connectors for arrays of optical fibers, and methods for fabricating multi-fiber connectors.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors ("connectors") are often provided on the ends of fiber optic cables. Many different types of fiber optic connectors exist. In environments that require high density interconnects and/or high bandwidth, such as data centers, multi-fiber optical connectors are the most widely used. Multi-fiber optical connectors are suitable for use with multi-fiber cables and frequently utilize multi-fiber ferrules. One example of a multi-fiber optical connector is the multi-fiber push on (MPO) connector, which incorporates a mechanical transfer (MT) ferrule and is standardized according to TIA-604-5 and IEC 61754-7. These connectors can achieve a high density of optical fibers, which reduces the amount of hardware, space, and effort required to establish a large number of interconnects.

Typically, a MPO connector utilizes a single ferrule body defining microholes that extend through the body, wherein bare optical fibers are inserted into the microholes and held in place with an adhesive. It is not trivial to insert a planar array of optical fibers (e.g., emanating from a fiber ribbon) into microholes of a ferrule, and such a process may be difficult to automate. Although V-groove arrays have also been used for retaining optical fibers in multi-fiber connectors, presence of contaminants (e.g., dust) and/or alignment challenges may render it difficult to consistently produce such connectors with high manufacturing yields.

The art continues to seek multi-fiber connectors and fabrication methods that address limitations associated with conventional array-type connectors and fabrication methods.

SUMMARY

Aspects of the present disclosure provide a multi-fiber connector and fabrication method using a multi-fiber ferrule having a medial portion defining at least one array of grooves for receiving at least one array of optical fibers. In the context of a multi-fiber connector, an array of grooves is recessed relative to an upper surface of a medial portion of a ferrule, wherein each groove has a maximum depth greater than a diameter of an uncoated fiber segment to be received by the groove. Each groove is shaped and sized to permit a lower portion of a corresponding optical fiber to lack contact with the groove over large arc length of the optical fiber. For example, a non-contacting portion of each optical fiber may comprise an arc of at least 120 degrees, at least 150 degrees, or another threshold angle disclosed herein, centered at lowermost boundary of the uncoated fiber segment. A method for fabricating a multi-fiber connector with a multi-fiber ferrule having a medial portion defining a array of grooves includes flexure of the medial portion to arrange an upper surface of the medial portion in a non-linear configuration to expand an average width of at least some grooves of an array of grooves, receiving an array of optical fibers in the array of grooves when the upper surface of the medial portion is in the non-linear configuration, pushing the array of optical fibers in a direction (e.g., upward) away from the bottom of each groove, and securing the optical fibers in the grooves. A resulting multi-fiber connector includes optical fibers that are not over-constrained.

In an exemplary aspect, a multi-fiber connector comprises an array of optical fibers each having a first uncoated segment that has a first diameter and that has a first outer surface, and comprises a multi-fiber ferrule comprising a medial portion defining an array of grooves that are recessed relative to an upper surface of the medial portion, wherein each groove of the array of grooves has a first maximum depth that is greater than the first diameter. The array of optical fibers is received within the array of grooves, with the first uncoated segment of each optical fiber positioned in a corresponding groove of the array of grooves. When the multi-fiber ferrule is oriented with the upper surface of the medial portion facing upward, each optical fiber comprises a non-contacting portion of the first outer surface that is devoid of contact with the array of grooves, and the non-contacting portion comprises an arc of at least 120 degrees (or at least 150 degrees, or another threshold angular range specified herein) and that is centered at a horizontal tangent of a lowermost boundary of the first outer surface.

In another exemplary aspect, a method is provided for fabricating a multi-fiber connector that includes a ferrule having a medial portion spanning between first and second lateral portions each comprising a thickness greater than a maximum thickness of the medial portion, the medial portion defining an array of grooves that are recessed relative to an upper surface of the medial portion. The method comprises multiple steps. One step comprises causing flexure of the medial portion to arrange the upper surface in a non-linear configuration, thereby expanding an average width of at least some grooves of the array of grooves. Another step comprises receiving an array of optical fibers within the grooves when the upper surface of the medial portion is arranged in the non-linear configuration, with a first uncoated segment of each optical fiber positioned in a corresponding groove of the array of grooves, and with each first uncoated segment having a first diameter and a first outer surface. Another step comprises pushing the array of optical fibers in a direction perpendicular to the upper surface and away from a bottom of each groove of the array of grooves with the upper surface arranged in a linear configuration, to cause the array of optical fibers to contact a surface of a reference block positioned adjacent to the upper surface. Another step comprises securing the first uncoated segments of the array of optical fibers within the array of grooves.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to a multi-fiber connector and fabrication method using a multi-fiber ferrule having a medial portion defining at least one array of grooves for receiving at least one array of optical fibers. In such a connector, each groove defined in the ferrule has a maximum depth greater than a diameter of an uncoated fiber segment to be received by the groove, and each groove is shaped and sized to permit a lower portion of a corresponding optical fiber to lack contact with the groove over large arc length of the optical fiber. Methods for fabricating a multi-fiber fiber optic connector including flexure of a medial portion of a groove-defining multi-fiber ferrule are also disclosed herein.

Before discussion formation of multi-fiber ferrules having arrays of grooves receiving optical fiber arrays and associated fabrication methods, conventional multi-fiber connectors and conventional V-groove arrays will be introduced.

Figure 1:
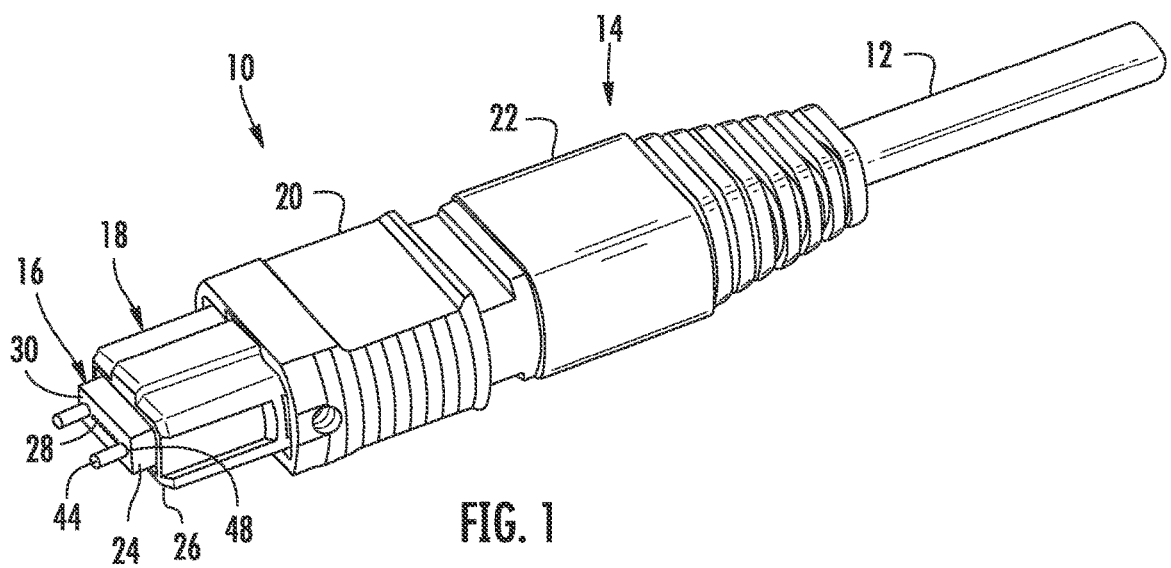
FIG. 1 is a perspective view of a fiber optic connector and an associated fiber optic cable forming a fiber optic cable assembly, with the fiber optic connector including a multi-fiber ferrule having an array of microholes receiving an array of optical fibers, to serve as a comparison structure for subsequently described embodiments.
Figure 2:
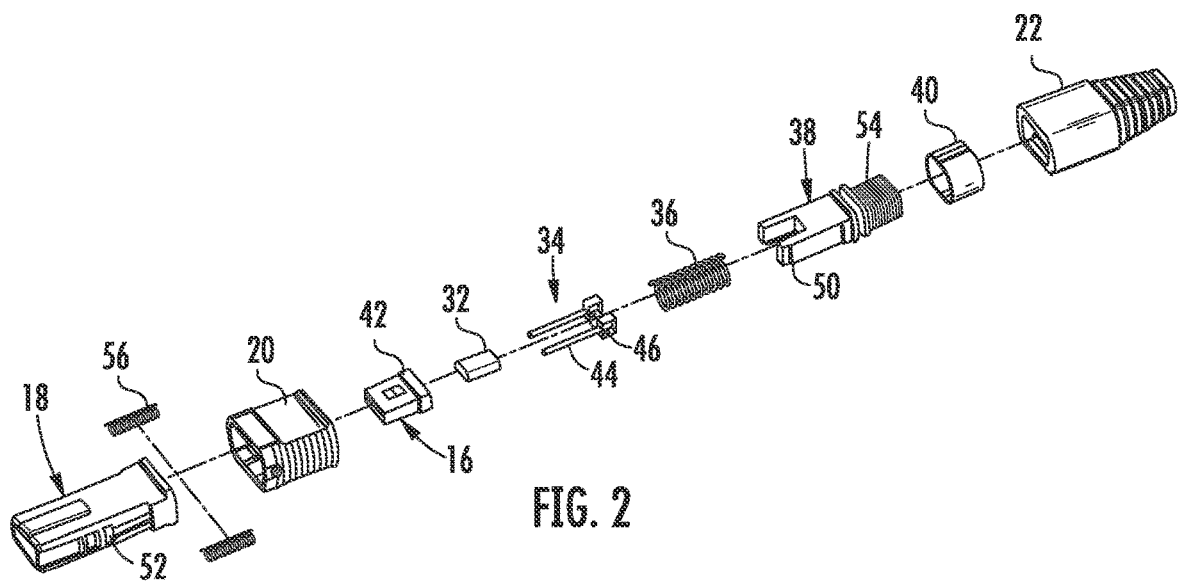
FIG. 2 is an exploded perspective view of the fiber optic cable assembly of FIG. 1.

One example of a conventional fiber optic connector 10 (also referred to as "optical connector 10", or simply "connector 10") is shown in FIG. 1, with an exploded view of the connector being provided in FIG. 2. The connector 10 is shown in the form of an MTP® connector, which is particular type of MPO connector (MTP® is a trademark of US Conec Ltd.). FIGS. 1 and 2 will be provided to facilitate discussion, as the multi-fiber ferrules and other components shown in subsequent figures (e.g., beginning with FIG. 5A) may be used in connection with the same type of connector as the connector 10. However, persons skilled in the field of optical connectivity will appreciate that the connector 10 is merely an example, and that the general principles disclosed with respect to the multi-fiber ferrules and other components shown in subsequent figures may also be applicable to other connector designs.

As shown in FIG. 1, the connector 10 may be installed on a fiber optic cable 12 ("cable") to form a fiber optic cable assembly 14. The connector 10 includes a ferrule 16, a housing 18 received over the ferrule 16, a slider 20 received over the housing 18, and a boot 22 received over the cable 12. The ferrule 16 is spring-biased within the housing 18 so that a front portion 24 of the ferrule 16 extends beyond a front end 26 of the housing 18. Optical fibers (not shown) carried by the cable 12 extend through bores 28 (also referred to as micro-holes) defined in the ferrule 16 before terminating at or near a front end face 30 of the ferrule 16. The optical fibers are secured within the ferrule 16 using an adhesive material (e.g., epoxy) and can be presented for optical coupling with optical fibers of a mating component (e.g., another fiber optic connector; not shown) when the housing 18 is inserted into an adapter, receptacle, or the like.

As shown in FIG. 2, the connector 10 also includes a ferrule boot 32, guide pin assembly 34, spring 36, crimp body 38, and crimp ring 40. The ferrule boot 32 is received in a rear portion 42 of the ferrule 16 to help support the optical fibers extending to the ferrule bores 28 (shown in FIG. 1). The guide pin assembly 34 includes a pair of guide pins 44 extending from a pin keeper 46. Features on the pin keeper 46 cooperate with features on the guide pins 44 to retain portions of the guide pins 44 within the pin keeper 46. When the connector 10 is assembled, the pin keeper 46 is positioned against a back surface of the ferrule 16, and the guide pins 44 extend through pin holes 48 (shown in FIG. 1) provided in the ferrule 16 so as to project beyond the front end face 30 of the ferrule 16. Both the ferrule 16 and guide pin assembly 34 are biased to a forward position relative to the housing 18 by the spring 36. The crimp body 38 is inserted into the housing 18 when the connector 10 is assembled and includes latching arms 50 that engage recesses 52 in the housing 18. The spring 36 is compressed by this point and exerts a biasing force on the ferrule 16 via the pin keeper 46. The rear portion 42 of the ferrule 16 defines a flange that interacts with a shoulder or stop formed within the housing 18 to retain the rear portion 42 of the ferrule 16 within the housing 18. Aramid yarn or other strength members (not shown) from the cable 12 are positioned over an end portion 54 of the crimp body 38 that projects rearwardly from the housing 18, and secured to the end portion 54 by the crimp ring 40. The boot 22 covers this region, as shown in FIG. 1, and provides strain relief for optical fibers emanating from the fiber optic cable 12 by limiting any extent to which the connector 10 can bend relative to the fiber optic cable 12.

Figure 3:
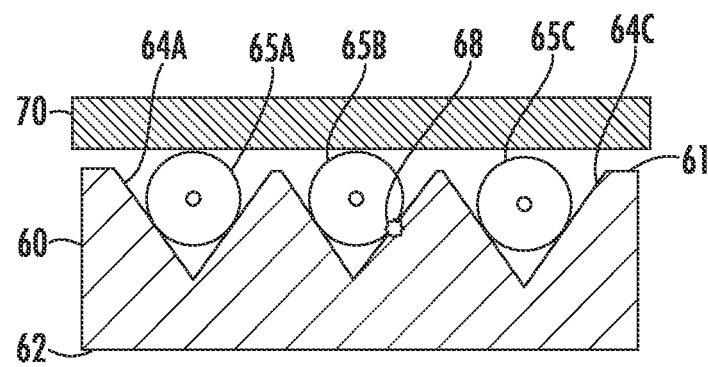
FIG. 3 is a cross-sectional view of an array of fibers received in grooves of a conventional V-groove array member and covered with a cover member, to serve as a comparison structure for subsequently described embodiments.

FIG. 3 is a cross-sectional view of an array of optical fibers 65A-65C received in V-grooves 64A-64C defined in an upper surface 61 of a conventional V-groove array member 60 and covered with a cover member 70, to serve as a comparison structure for subsequently described embodiments. Each optical fiber 65A-65C has a diameter that exceeds a height of the corresponding V-groove 64A-64C. A dust particle 68 present in one (e.g., middle) V-groove causes the corresponding optical fiber 65B to be elevated relative to (and therefore not perfectly collinear with) the other optical fibers 65A, 65C, as evidenced by the cover member 70 being arranged in contact with only the two optical fibers 65A-65B, such that the cover member 70 is slightly non-parallel to the upper and lower surfaces 61, 62 of the V-groove array member 60. The combination of the optical fibers 65A-65C, V-groove array member 60, and cover member are in an (undesirable) overconstrained condition (referring to the multiple constraints acting on the same degree of freedom), whereby the presence of a dust particle 68 interferes with collinearity of the optical fibers 65A-65C. This non-collinearity of the optical fibers 65A-65C may lead to insertion loss if the V-groove array member 60 is to be coupled with another fiber array (not shown).

Figure 4A:
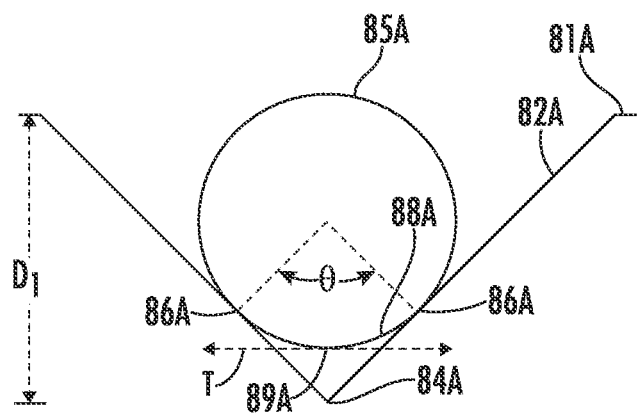
FIG. 4A is a front schematic view of an optical fiber received within a conventional V-groove having adjacent walls oriented about 90 degrees from one another.

FIG. 4A is a front schematic view of an optical fiber 85A received within a conventional V-groove having adjacent walls 82A that are oriented about 90 degrees from one another. As shown, the optical fiber 85A has a diameter that is greater than a height of the V-groove, measured as the distance between an upper surface 81A and a trough 84A thereof. The optical fiber 85A contacts the walls 82A at two locations 86A, such that a non-contacting portion 88A of an outer surface of the optical fiber 85A spans an arc angle θ centered at a horizontal tangent T at a lowermost boundary 89A of an outer surface of the optical fiber 85A. As illustrated in FIG. 4A, the angle θ is about 90 degrees.

Figure 4B:
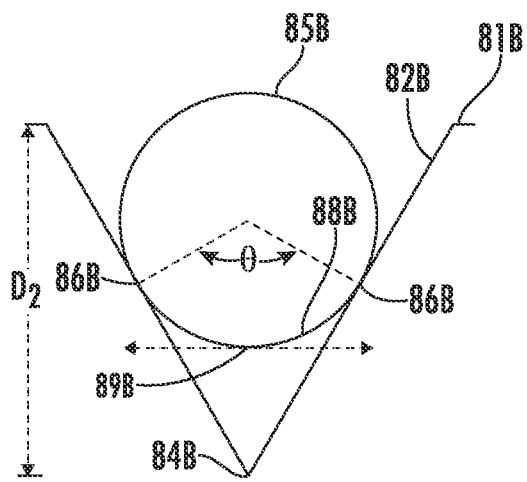
FIG. 4B is a front schematic view of an optical fiber received within a conventional V-groove having adjacent walls oriented about 60 degrees from one another.

FIG. 4B is a front schematic view of an optical fiber 85B received within a conventional V-groove having adjacent walls 82B that are oriented about 58 degrees from one another. As shown, the optical fiber 85B has a diameter that is greater than a height of the V-groove, measured as the distance between an upper surface 81B and a trough 84B thereof. The optical fiber 85B contacts the walls 82B at two locations 86B, such that a non-contacting portion 88B of an outer surface of the optical fiber 85B spans an arc angle θ centered at a horizontal tangent T at a lowermost boundary 89B of an outer surface of the optical fiber 85B. As illustrated in FIG. 4B, the angle θ is about 116 degrees.

In both of the configurations shown in FIGS. 4A-4B, presence of any contaminants in a V-groove has the potential to interfere with (e.g., vertical) positioning of optical fibers 85A-85B relative to corresponding groove walls 82A, 82B.

Having described known connectors and V-groove devices for receiving optical fibers, embodiments of the present disclosure (e.g., including novel multi-fiber ferrule configurations and with optical fiber arrays, and associated methods) will now be described.

Various embodiments disclosed herein provide a multi-fiber connector that includes a multi-fiber ferrule defining an array of grooves in an upper surface of a medial portion, and an array of optical fibers with uncoated segments thereof received in the array of grooves. The optical fibers may be secured in the grooves with adhesive material (e.g., a UV-curable or multi-part adhesive material) and/or a groove covering block. Each groove has a maximum depth greater than (e.g., about 5% to 15% greater than) a diameter of an optical fiber segment to be received therein, and is shaped and sized to permit a lower portion of an optical fiber segment to lack contact with the groove over large arc length of the optical fiber when an upper surface of the medial portion defining the grooves facing upward. For example, a non-contacting portion of each optical fiber may comprise an arc of at least 120 degrees, at least 150 degrees, or another threshold angle disclosed herein, centered at lowermost boundary of the uncoated fiber segment. Each groove may be slightly tapered (e.g., with walls tapered 1 to 3 degrees from vertical, such that a groove is wider at an opening thereof, and narrower at a trough thereof), or untampered (with vertical walls providing a groove width that does not vary with respect to depth). In certain embodiments, an uncoated optical fiber segment may have a diameter of 125 μm, and a groove may have a depth in a range of 130 μm to 140 μm. Optical fiber segments may be introduced into grooves from the top, avoiding the difficulty associated with threading individual fibers into micro-holes, and more easily permitting optical fiber introduction to be automated. When optical fiber segments are received within grooves, fiber positioning is isostatic, and not hyperstatic (i.e., overconstrained) as in the case of conventional precision V-groove assemblies (such as shown in FIG. 3).

Figure 5A:
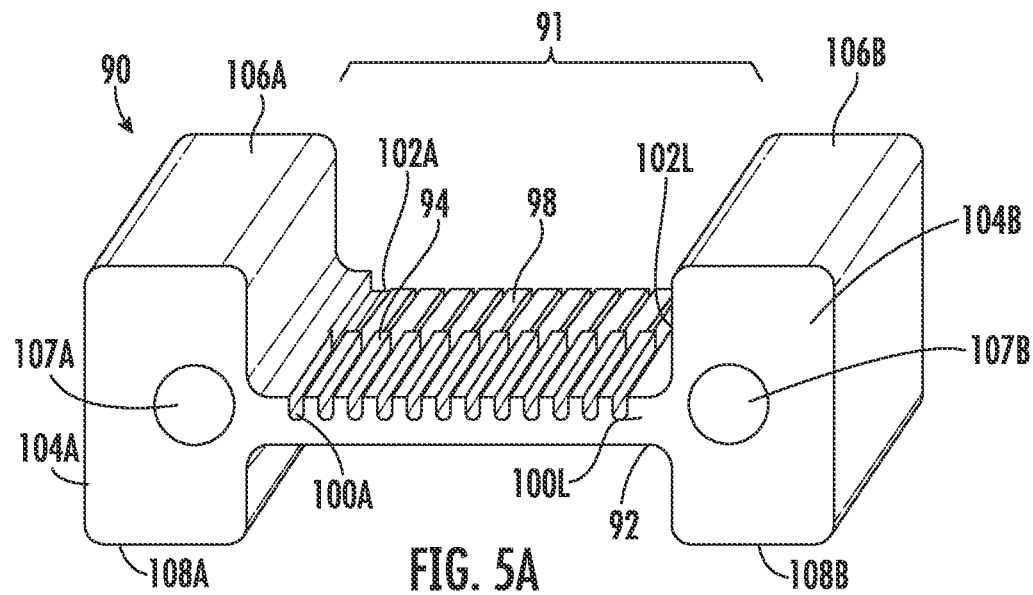
FIG. 5A is a perspective view of a multi-fiber ferrule including an array of grooves that are recessed relative to an upper surface of a medial portion thereof, and being useable as part of a multi-fiber connector according to one embodiment of the present disclosure.
Figure 6:
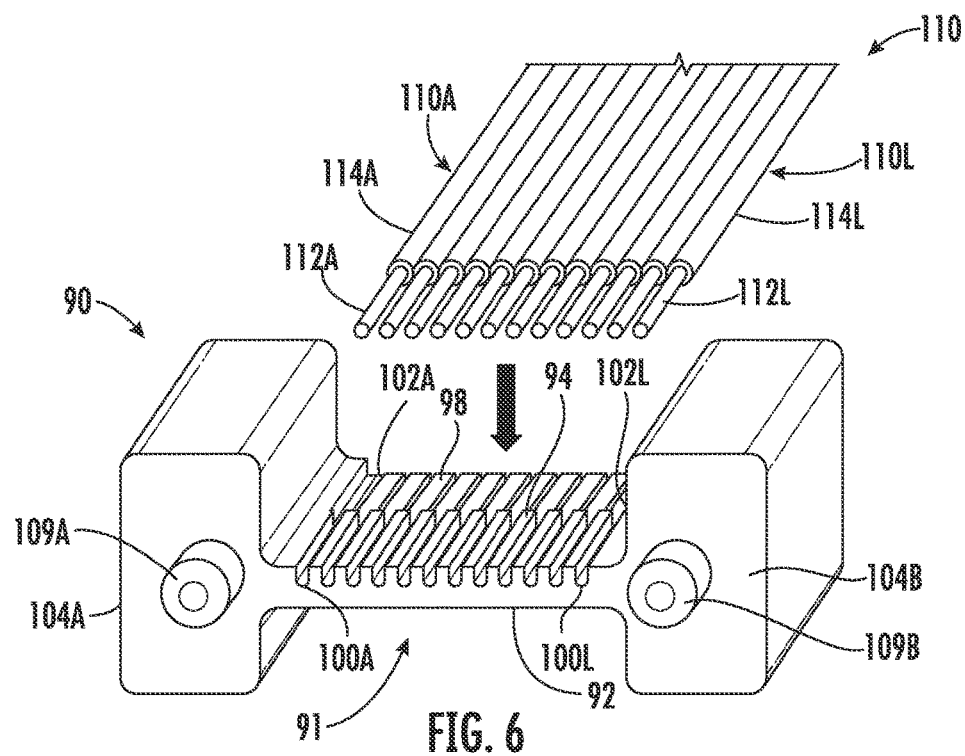
FIG. 6 is a perspective view of the of the multi-fiber ferrule of FIGS. 5A-5B, showing alignment pins received within apertures thereof, and showing an array of optical fibers positioned above the array of grooves defined in the medial portion of the ferule.
Figure 18A:
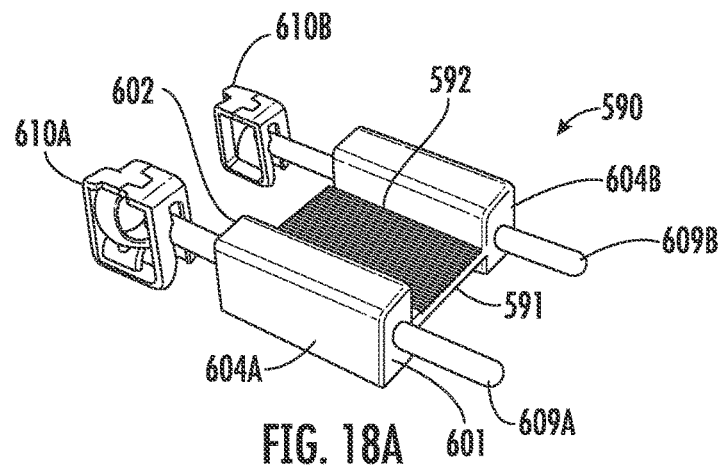
FIG. 18A is a perspective view of a first multi-fiber ferrule useable in a connector according to one embodiment of the present disclosure, with alignment pins extending through apertures defined in lateral portions of the ferrule.
Figure 18B:
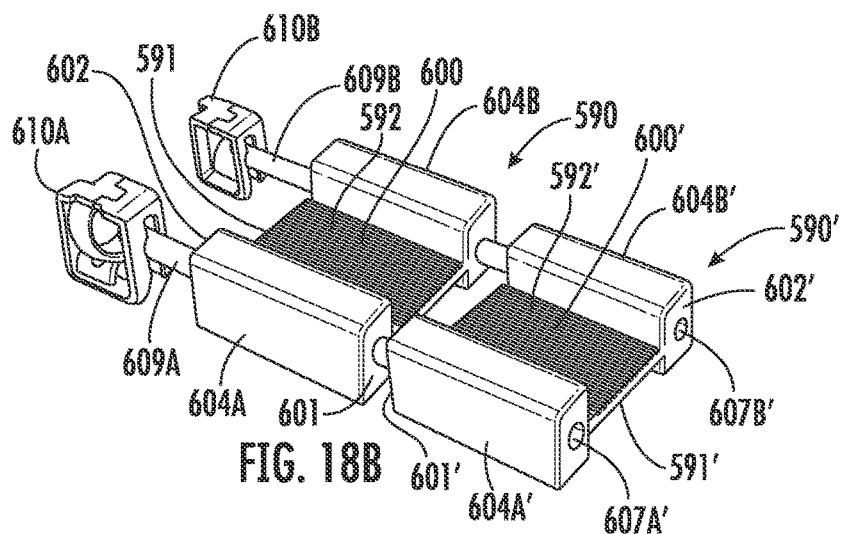
FIG. 18B is a perspective view of the first multi-fiber ferrule and alignment pins of FIG. 18A, with the alignment pins further extending through apertures defined through lateral portions of a second multiple-fiber ferrule.

In certain embodiments, a multi-fiber ferrule may be fabricated of aluminum, titanium, or zinc alloys, ceramic materials, or highly glass-filled polymers, by methods such as precision extrusion, injection molding, and/or electron discharge machining (EDM). In certain embodiments, grooves may be defined in an upper and/or a lower surface of a medial portion of a multi-fiber ferrule. In certain embodiments, grooves defined in a medial portion may have constant or substantially constant shape and dimensions (e.g., depth, wall angle, etc.) from a front to a rear (or proximal end to distal end) of the medial portion (e.g., as shown in FIGS. 18A-18B, described hereinafter). In certain embodiments, grooves defined in a front or proximal section of a medial portion may have one dimension to receive uncoated optical fiber segments while groove extensions defined in a rear or distal section of the medial portion may have different shapes and/or dimensions (e.g., depth, wall angle, etc.) to receive coated optical fiber segments (e.g., as shown in FIGS. 5A and 6, described hereinafter), wherein such an arrangement may be produced by techniques such as injection molding, or by extrusion followed by machining (or another material removal process).

In certain embodiments, a multi-fiber ferrule may resemble a H-shape, with a thin medial portion arranged between increased thickness lateral portions. In certain embodiments, each lateral portion may comprise a thickness in a range of 2 mm to 2.7 mm, or about 2.2 to about 2.6 mm, or about 2.4 mm, and the medial portion may have a thickness in a range of from about 0.3 mm to about 0.7 mm, or about 0.5 to about 0.65 mm, or about 0.6 mm. A thickness of a medial portion of a multi-fiber ferrule may take into account material properties of the material of the ferrule to permit the medial portion to be flexed into a configuration in which at least the top surface of the medial portion is non-linear (e.g., curved) in shape to thereby expand an average width of at least some of the grooves to ease the insertion of uncoated optical fiber segments (not shown) into the grooves.

In certain embodiments, a medial portion of a multi-fiber ferrule may be flexed such that an upper surface thereof assumes a non-linear (e.g., curved) configuration, to expand an average width of at least some grooves of the array of grooves defined in the medial portion in order to allow easy insertion of multiple optical fibers at a time into the array of grooves (i.e., with each groove receiving one optical fiber). Following insertion, the medial portion of the multi-fiber ferrule may be flexed (or a bending force may be released) back to its straight position, causing an average width of each groove to return to an unexpanded state, thereby promoting self-gripping of optical fibers within the grooves. In certain embodiments, a medial portion of the multi-fiber ferrule is initially subjected to elastic flexure, whereby upon release of a bending moment, an upper portion of the medial portion will return to a flat configuration of its own accord, without requiring imposition of a counteracting bending moment. Alternatively, initial flexure may result in non-elastic deformation. In certain embodiments, a bending moment of a first orientation may be applied to a medial portion of a multi-fiber ferrule to cause the medial portion to flex in one direction, and a thereafter a bending moment of an opposing second orientation may be applied to the medial portion in order the cause the medial portion to flex in a direction opposing the one direction. Dimensions of the grooves and the material of the ferrule may be selected to ensure a desirable range of lateral gripping force without risking breakage of optical fibers or silica cladding portions thereof.

After optical fiber segments are received in grooves of a multi-fiber ferrule that are deeper than a diameter of each optical fiber segment, the optical fiber segments may be moved (e.g., pressed as a group using an external push bar, roller, or other mechanism) in a direction away from troughs of the grooves toward a reference block positioned in contact with a medial portion of the ferrule, to linearly arrange optical fiber segments while being separated from the trough of each groove. Positioning of optical fiber segments within grooves of ferrule may be ensured independently in both a horizontal and vertical direction. In certain embodiments, optical fibers may be secured in grooves with adhesive material, such as a bi-component adhesive or UV-curable adhesive. In certain embodiments, a reference block may be removed from a ferrule after the optical fibers are secured in position. In certain embodiments, a reference block may be embodied in a groove covering block that is part of a final assembly, remaining positioned against a portion of a multi-fiber ferrule in a resulting multi-fiber connector. In certain embodiments, a reference block may comprise a precision glass plate that is secured in place with a compressive metallic clip and/or with adhesive material. In certain embodiments, a reference block may comprise an extruded or injection molded body produced in manner similar to a multi-fiber ferrule. Optionally, a reference block may be configured to be mechanically retained by one or more features (e.g., protrusions or recesses arranged at side surfaces of lateral portions) of a multi-fiber ferrule.

In certain embodiments, a multi-ferrule may include apertures or recesses that are defined in lateral portions and are configured to receive alignment pins (e.g., 0.7 mm diameter precision pins 44 as shown in FIG. 2). In certain embodiments, a central axis of each alignment pins when received by a multi-fiber ferrule may be arranged coplanar with an array of optical fibers received in grooves of the ferrule. In certain embodiments, a plane containing the central axis of each alignment bore and/or alignment pin when received by a multi-fiber ferrule may be arranged with a desired offset to the plane of the array of optical fibers received in grooves of the multi-fiber ferrule.

Figure 5B:
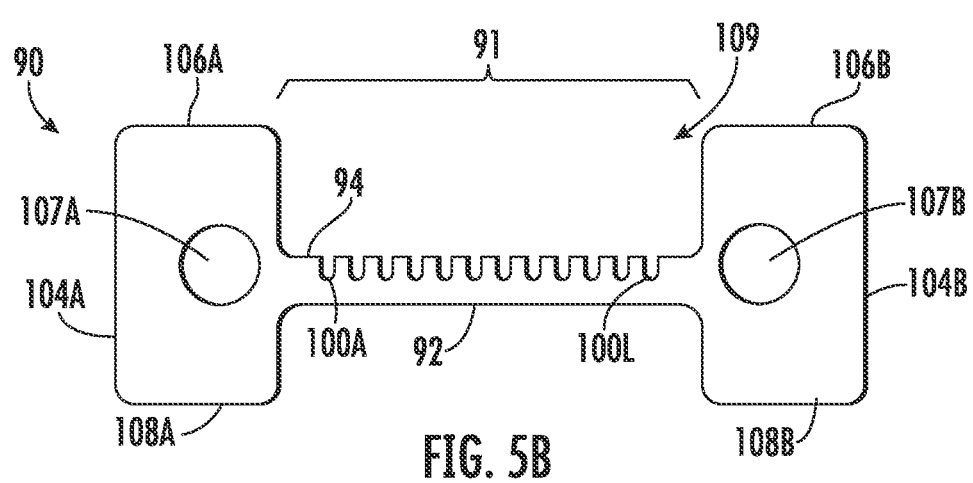
FIG. 5B is a front elevational view of the multi-fiber ferrule of FIG. 5A.

FIG. 5A is a perspective view, and FIG. 5B is a front elevational view, of a multi-fiber ferrule 90 that is useable as part of a multi-fiber connector according to one embodiment. The multi-fiber ferrule 90 includes a medial portion 91 arranged between lateral portions 104A-104B of greater thickness than to the medial portion 91. The medial portion 91 includes an upper surface 94 and an opposing lower surface 92, wherein an array of grooves 100A-100L and an array of groove extensions 102A-102L are defined in the medial portion 91 and recessed relative to the upper surface 94. An upper boundary of each groove 100A-100L extends to the upper surface 94, while an upper boundary of each groove extension 102A-102L terminates is at a level lower than the upper surface 94. Each groove extension 102A-102L is registered (i.e., aligned) with a corresponding groove 100A-100L, with each groove extension 102A-102L being configured to receive a coated optical fiber segment (e.g., as shown in FIG. 6), and each groove 100A-100L being configured to receive an uncoated optical fiber segment (e.g., as shown in FIG. 6). Each lateral portion 104A-104B has a thickness substantially greater than that of the medial portion 91, with the medial portion 91 being arranged at a level approximately midway between upper surfaces 106A-106B and lower surfaces 108A-108B of the lateral portions 104A-104B, such that the multi-fiber ferrule 90 comprises a widened "H"-shape. Each lateral portion 104A-104B defines an aperture 107A-107B extending horizontally therethrough in a direction parallel to the grooves 100A-100L. These apertures 107A-107B are sized and shaped to receive alignment pins (e.g., 109A-109B as shown in FIG. 6), wherein upon insertion, a centerline of the alignment pins may be arranged coplanar with an array of optical fibers (e.g., 110 as shown in FIG. 6). As shown, a recess 109 is provided above the upper surface 94 and between the lateral portions 104A, 104B. In certain embodiment, a reference block (not shown) may be positioned in the recess 109 to assist with optical fiber positioning and/or retention after optical fiber segments are received by the grooves 100A-100L.

In certain embodiments, a centerline of the alignment pins (e.g., 109A-109B as shown in FIG. 6) associated with the multi-fiber ferrule 90 may be offset from a centerline of an optical fiber array received by the grooves 100A-100L. When two multi-fiber ferrules are first mated in contact with one another, tips of optical fibers supported by the ferrules may slide slightly on a plane of contact (e.g., because of spring force applied to the ferrules) until the pins and ferrules resist that sliding by deforming slightly. This deformation may be accommodated by a slight offset between a centerline of alignment pins associated with the ferrules, and a centerline of optical fiber arrays associated with the ferrules. In this regard, a plane containing a central axis of alignment bores of a multi-fiber ferrule may be arranged with a desired offset relative to a plane of an array of optical fibers received in grooves of the multi-fiber ferrule.

FIG. 6 is a perspective view of the multi-fiber ferrule 90 of FIGS. 5A-5B, showing alignment pins 109A-109B received within the apertures (107A-107B in FIGS. 5A-5B) defined in the lateral portions 104A-104B, and showing an array of optical fibers 110 positioned above the array of grooves 100A-100L and the array of groove extensions 102A-102L defined in the medial portion 91. As shown, the array of optical fibers 110 includes twelve optical fibers 110A-110L arranged in a one-dimensional array, wherein each optical fiber 110A-110L includes a coated fiber segment 114A-114L and an uncoated (e.g., stripped) fiber segment 112A-112L. Each groove 100A-100L is configured to receive an uncoated fiber segment 112A-112L, and each groove extension 102A-102L is configured to receive a length of a coated fiber segment 114A-114L. Although the grooves 100A-100L, groove extensions 102A-102L, and optical fibers 110A-110L are each provided as twelve in number, any suitable number of these elements (e.g., 8, 12, 24, or some other number) may be provided. In certain embodiments, after the optical fibers 110A-110L are received by the multi-fiber ferrule 90, the end of each uncoated segment 112A-112L may be cleaved and/or polished flush with a terminus of a corresponding groove 100A-100L.

As noted previously, the medial portion of a multi-fiber ferrule may be flexed such that an upper surface thereof assumes a non-linear (e.g., curved) configuration, to expand an average width of at least some grooves of the array of grooves defined in the medial portion in order to allow easy insertion of multiple optical fibers at a time into the array of grooves.

Figure 7A:
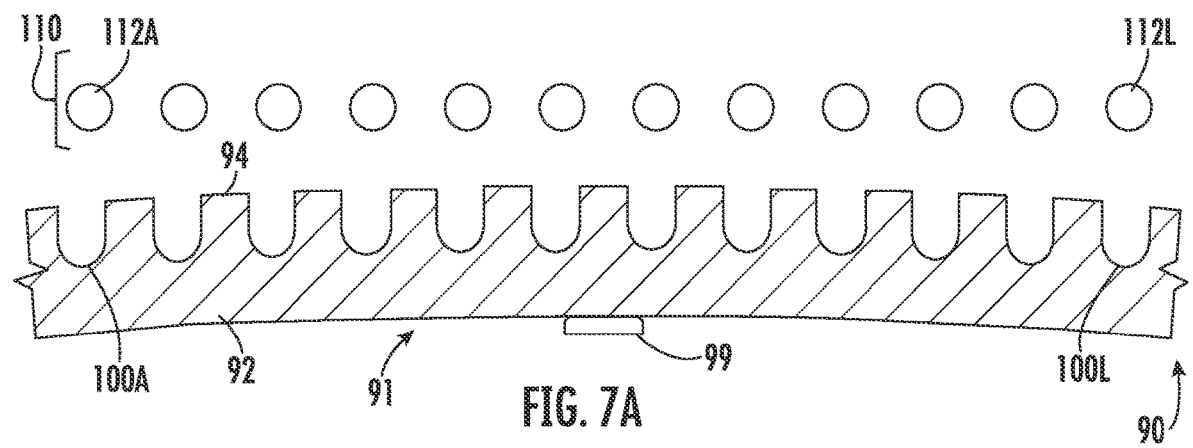
FIG. 7A is a front cross-sectional view of a medial portion of the multi-fiber ferrule of FIGS. 5A-5B and FIG. 6 arranged in a non-linear (curved) configuration over a centrally located external shim, with the array of optical fibers disposed above the array of grooves.

FIG. 7A is a front cross-sectional view of the medial portion 91 of the multi-fiber ferrule of FIGS. 5A-5B and 6 arranged in a non-linear (curved) configuration over a centrally located external shim 99, with the array of optical fibers 110 (specifically including uncoated fiber segments 112A-112L) disposed above the array of grooves 100A-100L. Each groove 100A-100L is roughly U-shaped and is recessed relative to the upper surface 94, which opposes the lower surface 92 that contacts the shim 99. In certain embodiments, each groove 100A-100L is configured to receive a 125 micron diameter uncoated optical fiber segment 112A-112L. When the medial portion 91 is flexed downward (e.g., by pressing downward along left and right ends of the medial portion 91 with the shim 99 positioned in contact with a center of the lower surface 92, ends of the medial portion 91 may be deflected by a nonzero angle (e.g., two to six degrees, or three to five degrees, or about a five degree angle from vertical) when the shim 99 has a thickness of 150 microns, and in such a configuration the medial portion 91 forms a shallow arch that causes an upper portion of each groove 100A-100L to be expanded in width (e.g., by 3 to 5 microns), thereby easing insertion of the uncoated fiber segments 112A-112L into the grooves 100A-100L by relative movement therebetween (e.g., by downward motion of the uncoated fiber segments 112A-112L and/or upward motion of the medial portion 91).

Figure 7B:
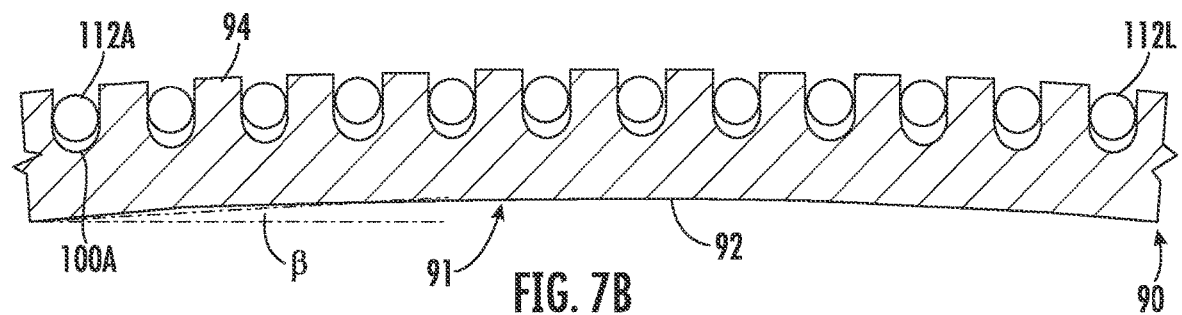
FIG. 7B provides substantially the same view as FIG. 7A, but with the array of optical fibers received within the array of grooves.
Figure 11A:
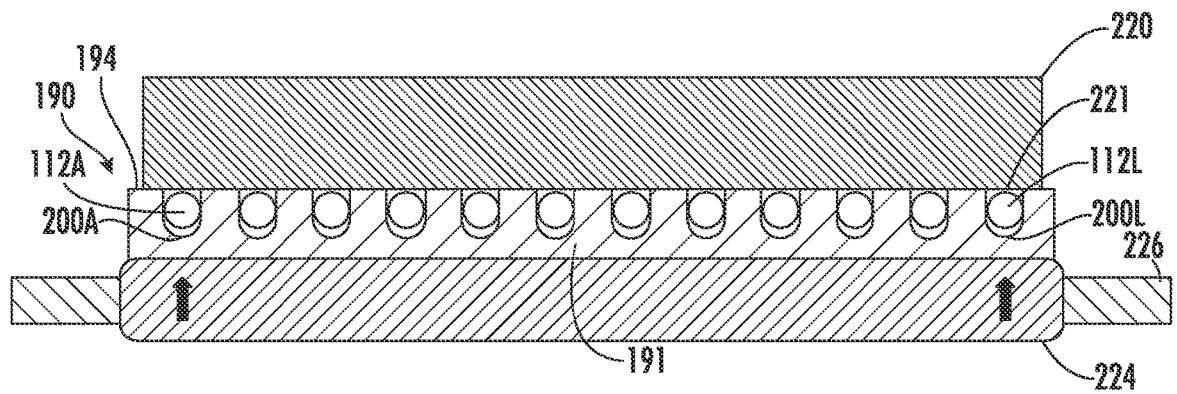
FIG. 11A is a front cross-sectional view of a medial portion of a multi-fiber ferrule with an array of optical fiber segments positioned proximate to a height midpoints of grooves defined in the medial portion, with a translatable element positioned below the optical fibers and with a reference block positioned above the optical fibers, both in a non-contacting relationship.
Figure 11B:
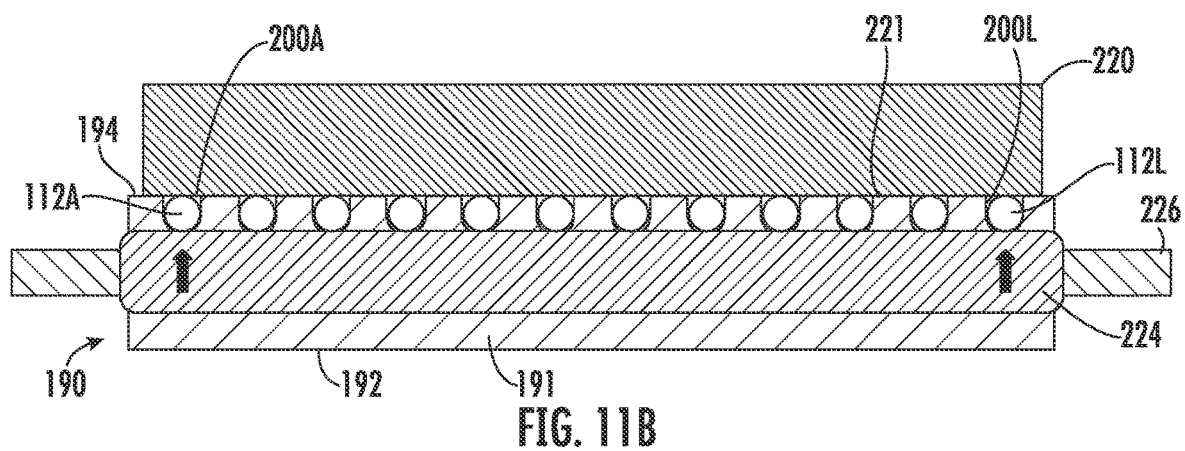
FIG. 11B is a front cross-sectional view of the items of FIG. 11A, following movement of the translatable element to push the optical fibers upward within the array of grooves to contact a lower surface of the reference block.
Figure 12:
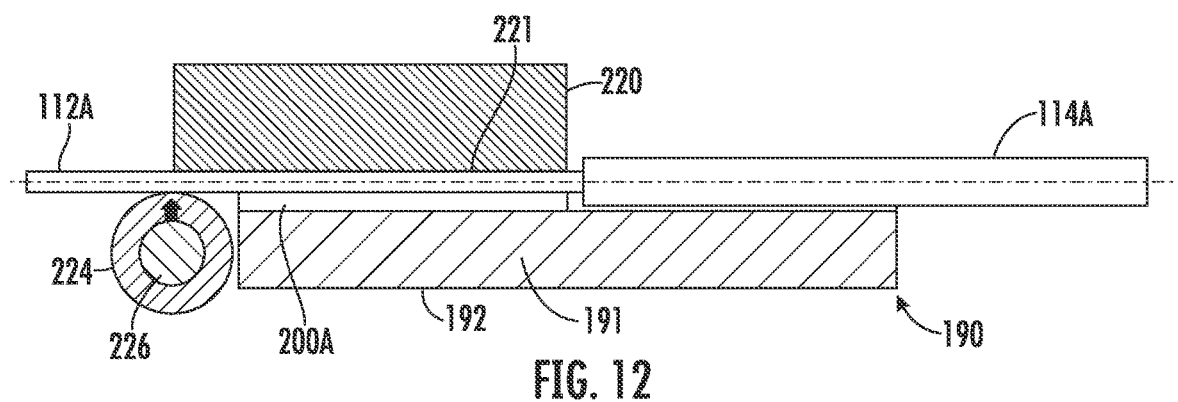
FIG. 12 is a side cross-sectional view of the optical fibers, ferrule portion, translatable element, and reference block of FIG. 11B, with an optical fiber contacting the translatable element and the reference block.

FIG. 7B shows the medial portion 91 of FIG. 7A remaining in an upwardly-flexed configuration, but with the uncoated fiber segments 112A-112L received within the grooves 100A-100L. As shown, the upper and lower surfaces 94, 92 of the medial portion 91 remain flexed into non-linear (e.g., curved) shapes, wherein a leftmost boundary of the lower surface 92 is deflected by an angle β (e.g., in a range of 1-5 degrees, or about 2-4 degrees, or about 3 degrees) relative to horizontal. In certain embodiments, when the medial portion 91 is flexed and an upper portion of each groove 100A-100L is expanded in width, a small clearance (e.g., 3 to 5 microns) between each uncoated fiber segment 112A-112L and a corresponding groove 100A-100L may be established, to beneficially accommodate passage of adhesive (not shown) that may surround each uncoated fiber segment 112A-112L in the grooves 100A-100L and/or permit free motion of each uncoated fiber segment 112A-112L within the grooves 100A-100L when the optical fibers are pressed upward (e.g., by an external push bar, roller, or other mechanism, as shown in FIGS. 11A-12).

Magnified cross-sectional views of optical fibers are provided in FIGS. 8A to 9, and are discussed below.

Figure 8A:
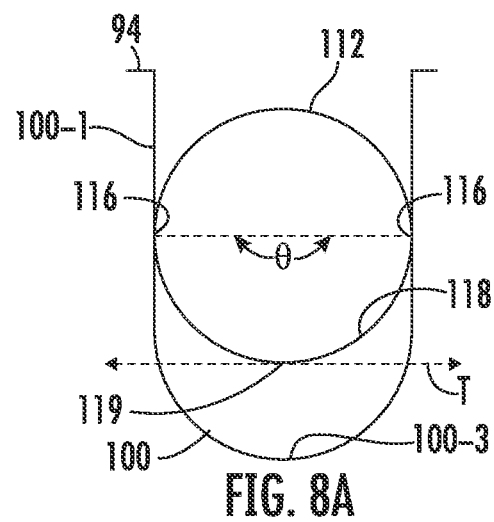
FIG. 8A is a simplified front cross-sectional view of an uncoated optical fiber segment arranged proximate to a height midpoint of a groove of the multi-fiber ferrule of FIG. 6.
Figure 9:
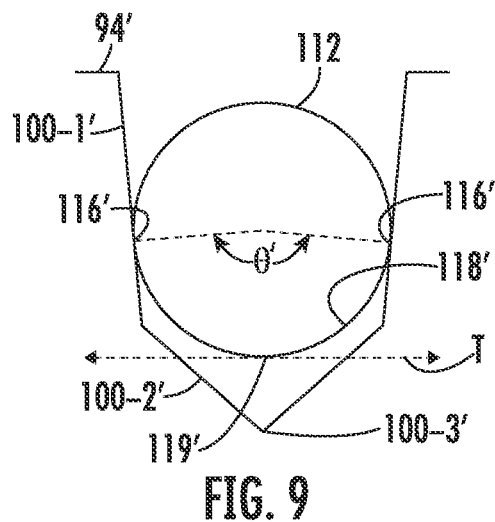
FIG. 9 is a simplified front cross-sectional view of an alternative groove having an optical fiber received therein according to an embodiment of the disclosure.

FIG. 8A is a simplified front cross-sectional view of an uncoated optical fiber segment 112 received within, and arranged proximate to a height midpoint of, a groove 100 of the multi-fiber ferrule of FIG. 6. As shown, the groove 100 has a U-shape, and the optical fiber segment 112 has a diameter that is smaller than a height of the groove 100, measured as the distance between an upper surface 94 and a trough 100-3 of the groove 100. The uncoated optical fiber segment 112 contacts walls 100-1 of the groove 100 at two locations 116, such that a non-contacting portion 118 of an outer surface of the uncoated optical fiber segment 112 spans an arc angle θ centered at a horizontal tangent T at a lowermost boundary 119 of an outer surface of the optical fiber segment 112. As illustrated in FIG. 8A, the angle θ is in a range of more than about 175 degrees (or in a range of 175 to 180 degrees, or a range of 176 to 179 degrees).

Figure 8B:
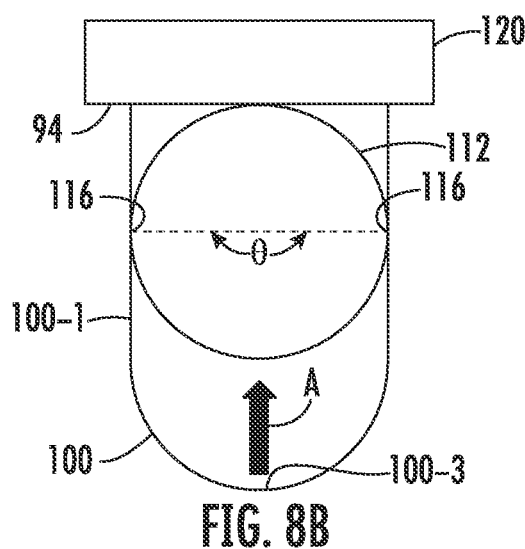
FIG. 8B is a simplified front cross-sectional view of the groove and uncoated optical fiber segment of FIG. 8A, following movement of the optical fiber segment upward within the groove to contact a reference block.

FIG. 8B is a simplified front cross-sectional view of the groove 100 and uncoated optical fiber segment 112 of FIG. 8A, following movement of the optical fiber segment 112 within the groove 100 (e.g., upward, in a direction away from the groove trough 100-3 as indicated by arrow A) to contact a reference block 120 positioned against an upper surface 94 (of the medial portion 91 of the ferrule 90, showing in FIGS. 4A-4B) bounding the groove 100. Such movement of the uncoated optical fiber segment 112 may be caused by pressing multiple optical fibers segments upward using a push bar, roller, or other structure (to be described hereinafter in connection with FIGS. 11A-12). In certain embodiments, the uncoated optical fiber segment 112 may have a diameter of 125 μm, and the groove 100 may have a depth in a range of 130 μm to 140 μm. In certain embodiments, the groove 100 may have a smaller depth (e.g., in a range of 50 μm to 125 μm, or in a range of 75 μm to 120 μm) to accommodate reduced clad optical fiber with outer diameter values smaller than 125 μm. In certain embodiments, grooves 100 may have a center-to-center pitch in a range of 150 μm to 250 μm FIG. 9 is a simplified front cross-sectional view of an alternative groove, composed of differently-tapered upper and lower wall portions 100-1', 100-2' that provide an angled (instead of curved) trough 100-3', with an uncoated optical fiber segment 112 received therein according to an embodiment of the disclosure. As shown, the optical fiber segment 112 has a diameter that is smaller than a height of the groove formed by the differently-tapered wall portions 100-1', 100-2', measured as the distance between an upper surface 94' and a trough 100-3' of the groove. The uncoated optical fiber segment 112 contacts upper wall portions 100-1' at two locations 116', such that a non-contacting portion 118' of an outer surface of the uncoated optical fiber segment 112 spans an arc angle θ centered at a horizontal tangent T at a lowermost boundary 119' of an outer surface of the optical fiber segment 112. As illustrated in FIG. 9, the angle θ is in a range of more than about 165 degrees.

Figure 10:
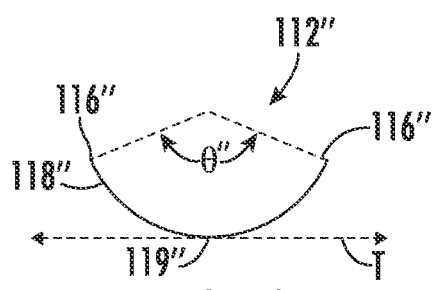
FIG. 10 is a front cross-sectional view of a wedge-shaped portion of an optical fiber showing an arc along a lower edge thereof corresponding to a non-contacting portion of the optical fiber when the optical fiber is received within a groove of a multi-fiber ferrule as disclosed herein.

FIG. 10 is a front cross-sectional view of a wedge-shaped portion of an optical fiber segment 112" having an arc 118" along a lower edge thereof that corresponding to a non-contacting portion of the optical fiber when received within a groove of a multi-fiber ferrule as disclosed herein. The arc 118" is centered at a lowermost boundary 119" of an outer surface of the optical fiber segment, and extends below and between two points of contact 116" with a ferrule groove (not shown), such that the arc 118" spans an arc angle θ" centered at a horizontal tangent T at a lowermost boundary 119' of an outer surface of the optical fiber segment 112". As illustrated in FIG. 10, the angle θ is in a range of more than about 130 degrees.

FIG. 11A is a front cross-sectional view of a medial portion 191 of a multi-fiber ferrule 190 with an array of optical fiber segments 112A-112L positioned proximate to height midpoints of grooves 200A-300L defined in the medial portion 191 of the ferrule 190, with a translatable element 224 such as a push bar 224 (connected to support 226) positioned below the optical fiber segments 112A-112L, and with a reference block 220 positioned above the optical fiber segments 112A-112L. Optionally, the translatable element 224 may be embodied in a rollable element such as rotatable cylinder to reduce friction upon contact with the optical fiber segments 112A-112L. Both the translatable element 224 and the reference block 220 are positioned in a non-contacting relationship with the optical fiber segments 112A-112L, in preparation for movement of the translatable element 224 upward to press the optical fiber segments 112A-112L (which extend beyond the ferrule 190) upward to contact the reference block 220. FIG. 11B is a front cross-sectional view of the items of FIG. 11A, following movement of the translatable element 224 to push the optical fibers segments 112A-112L upward within the array of grooves 200A-200L (i.e., away from troughs of the grooves 200A-200L) to contact a lower surface 221 of the reference block 220. In certain embodiments, adhesive material (not shown) may be provided in the grooves 200A-200L around the uncoated optical fiber segments 112A-112L to secure them in place if or when the reference block 220 is removed. Although the optical fiber segments 112A-112L are moved as a group by the reference block 220, each individual optical fiber segments 112A-112L is positioned independently relative to the others within a corresponding groove 200A-200L, providing isostatic positioning utility. Such system is more accommodating of the presence of dust or debris than prior art systems, such as the overconstrained V-groove array of FIG. 3.

FIG. 12 is a side cross-sectional view an uncoated optical fiber segment 112A, medial portion 191 of ferrule 190, translatable element 224, and reference block 220 positioned as in FIG. 11B, with the optical fiber segment 112A contacting the translatable element 224 and the reference block 220. As shown, the optical fiber segment 112A extends beyond the ferrule 190 to permit the optical fiber segment 112A to be pressed directly between the translatable element 224 and the lower surface 221 of the reference block 220.

FIG. 12 further shows a coated optical fiber segment 114A extending from the uncoated optical fiber segment 112A, with a portion thereof also supported by the ferrule 190.

Figure 13:
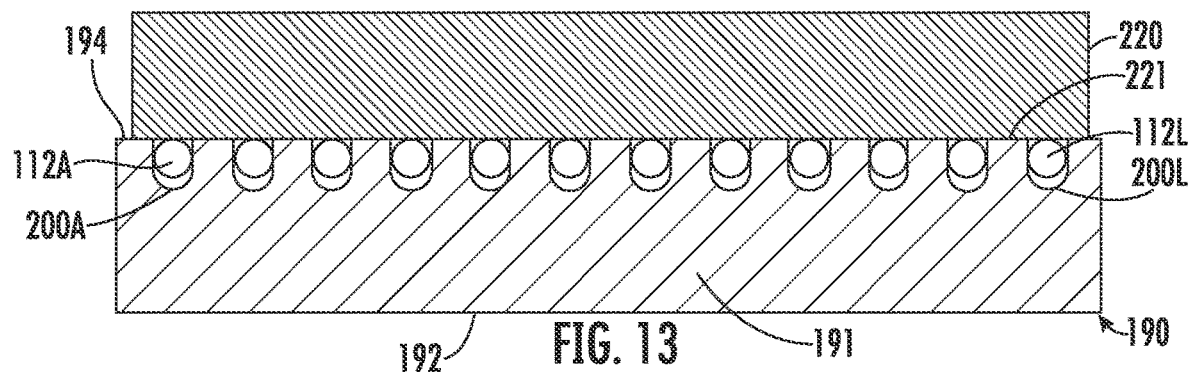
FIG. 13 is a front cross-sectional view of the ferrule portion, optical fibers, and reference block positioned as shown in FIG. 11B, following removal of the translatable element.

FIG. 13 is a front cross-sectional view of the medial portion 191, uncoated optical fiber segments 112A-112L, and reference block 220 positioned above and against the medial portion 191 as shown in FIG. 11B, following removal of the translatable element (224 in FIG. 11B). With As shown, the uncoated optical fiber segments 112A-112L are positioned at (or near) the top of corresponding grooves 200A-200L proximate to the lower surface 221 of the reference block 220, wherein the uncoated optical fiber segments 112A-112L may be secured in such position with adhesive material (not shown) in the grooves 200A-200L. In certain embodiments, a horizontal tangent of an uppermost boundary of each uncoated optical fiber segment 112A-112L is substantially registered with the upper surface 194 of the medial portion 191. Although only a medial portion 191 of a multi-fiber ferrule 190 is shown, it is to be recognized that in practice, the ferrule 190 may additionally include increased thickness lateral portions (e.g., 104A, 104B as shown in FIG. 6).

Various mechanisms may be used to flex a medial portion of a multi-fiber ferrule into a non-linear (e.g., curved) configuration. As noted previously herein, a shim may be arranged below a center of a medial portion of a multi-fiber ferrule, and the medial portion pressed downward along edges thereof to promote flexure. In certain embodiments, lateral portions of a multi-fiber ferrule may be positioned between vertical restraints, and a first plunger (e.g., a hydraulically or mechanically actuated plunger) may be used to press a center of a medial ferrule portion upward into a non-linear configuration to facilitate loading of optical fiber segments into grooves of the ferrule. If desired, a second plunger may subsequently be used to press a reference block downward against the medial portion of the ferrule, to promote downward flexure of the medial portion and/or permit optical fiber segments to be arranged at appropriate positions within the grooves of the ferrule.

Figure 14A:
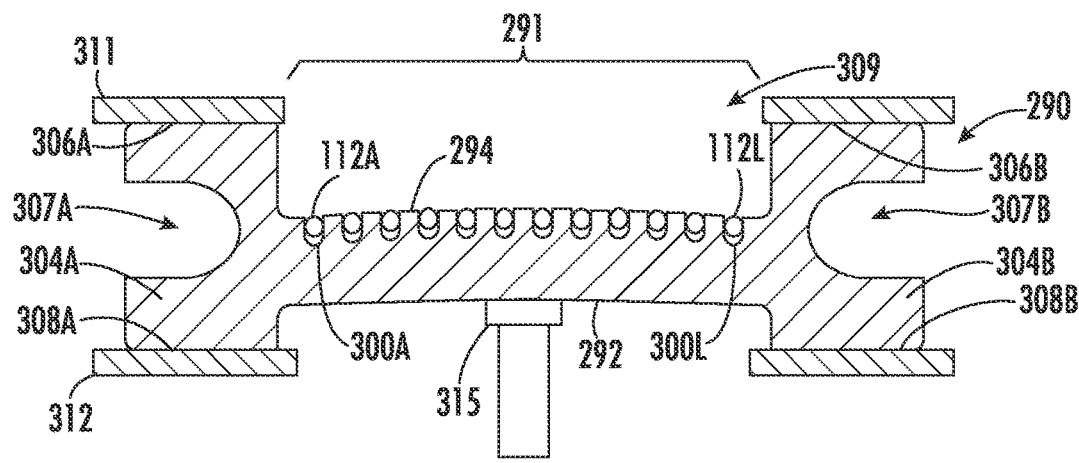
FIG. 14A is a front cross-sectional view of an array of optical fibers received within array of grooves that are recessed relative to a surface of a medial portion of a multi-fiber ferrule, with thicker lateral portions of the multi-fiber ferrule positioned between vertical restraints, and with a lower plunger flexing the medial portion upward into a non-linear (curved) configuration.

FIG. 14A is a front cross-sectional view of an array of uncoated optical fiber segments 112A-112L received within array of grooves 300A-300L that are recessed relative to an upper surface 294 of a medial portion 291 of a multi-fiber ferrule 290. Thicker lateral portions 304A-304B of the multi-fiber ferrule 290 have upper surfaces 306A-306B and lower surfaces 308A-308B that are positioned between vertical restraints 311-312 that are part of a static fixture. The lateral portions 304A-304B of the ferrule 290 also define recesses 307A, 307B for receiving alignment pins (not shown). A cavity 309 is provided above the upper surface 294 and between the lateral portions 304A, 304B. As shown, a lower plunger 315 is positioned below a center of the medial portion 291 to push the medial portion 291 upward to flex the upper surface 294 into a non-linear (curved) configuration, thereby expanding at least upper portions of the grooves 300A-300L to ease loading of the optical fiber segments 112A-112L therein.

Figure 14B:
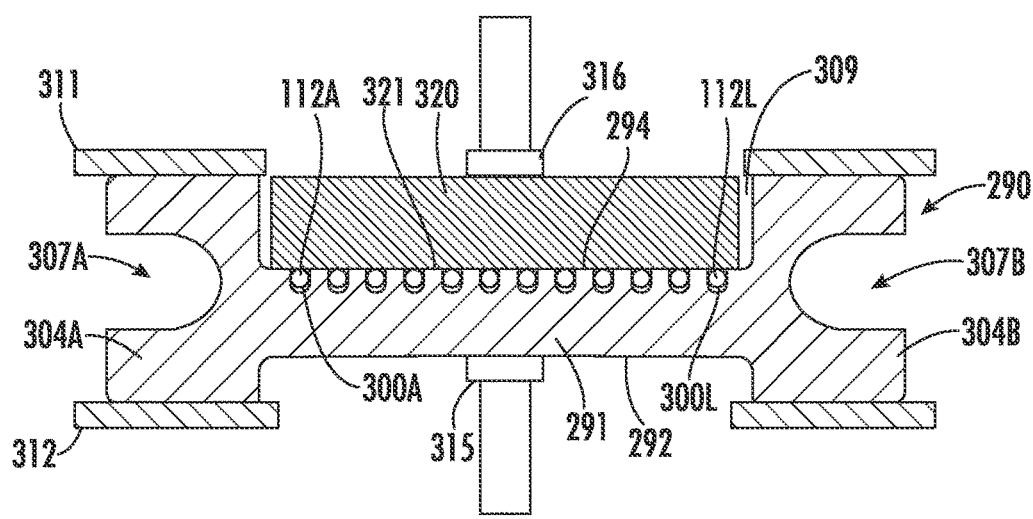
FIG. 14B is a front cross-sectional view of the optical fibers, multi-fiber ferrule, and vertical restraints of FIG. 14A, with a reference block positioned above the optical fibers and medial portion of the ferrule, and with the medial portion and reference block pressed between upper and lower plungers.
Figure 14C:
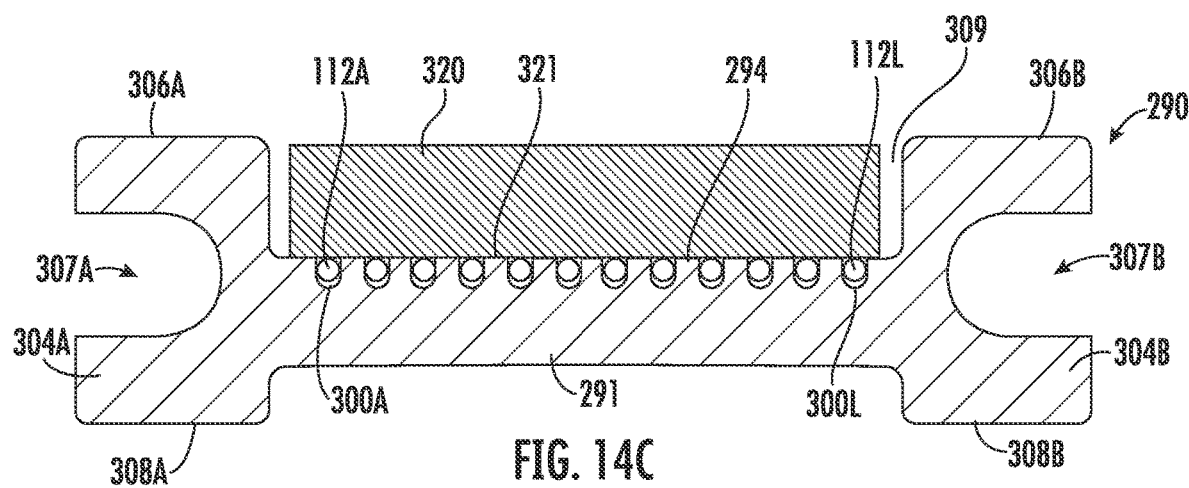
FIG. 14C is a front cross-sectional view of the optical fibers, multi-fiber ferrule, and reference block of FIG. 14B.

FIG. 14B shows the items of FIG. 14A, with addition of an upper plunger 316 to press a reference block 320 into the cavity 309 to cause a lower surface 321 thereof to contact the upper surface 294 of the medial portion 291 and contact optical fibers 112A-112L arranged in the grooves 300A-300L. The remaining elements of FIG. 14B are identical to those described in connection with FIG. 14A. Optionally, the reference block 320 may comprise or be embodied in a groove covering block that is part of a final assembly, remaining positioned against the medial portion 291 of the multi-fiber ferrule 290, and may be retained in position using adhesive (not shown) arranged in the cavity 309 proximate to the reference block 320. The upper plunger 316 may be used to push the reference block 320 and the medial portion 291 downward to cause an upper surface 294 of the medial portion 291 to assume a linear (non-curved) configuration. FIG. 14C is a front cross-sectional view of the optical fiber segments 300A-300L, multi-fiber ferrule 290, and reference block 320 of FIG. 14B, following removal of the ferrule 290 from a fixture including the support surfaces and plungers of FIG. 14C. The remaining elements of FIG. 14C are the same as described above in connection with FIGS. 14A-14B.

In certain embodiments, a medial portion of a multi-fiber ferrule may have a non-constant thickness, such as a thickness that is greatest at a center thereof (equally distanced between lateral portions of the ferrule). Such a configuration may assist in producing an arc-like or other desired shape along an upper surface of the medial portion of a ferrule when such medial portion is flexed upward to receive optical fiber segments in grooves thereof.

Figure 15A:
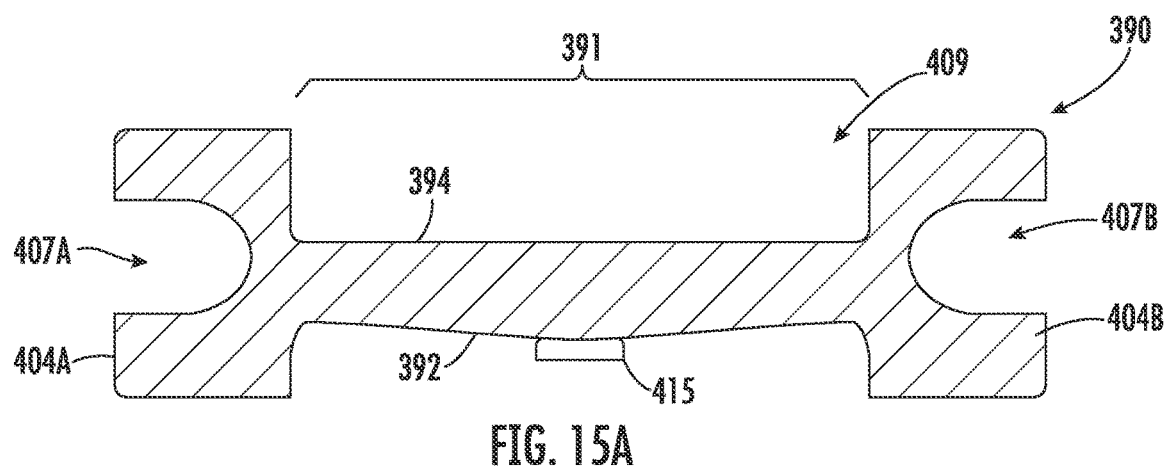
FIG. 15A is a simplified front cross-sectional view of a multi-fiber ferrule having a medial portion of non-constant thickness (being thickest at a center thereof) positioned between thicker lateral portions, with a shim arranged below the medial portion, and within an upper surface of the medial portion being in a non-deflected, flat configuration.
Figure 15B:
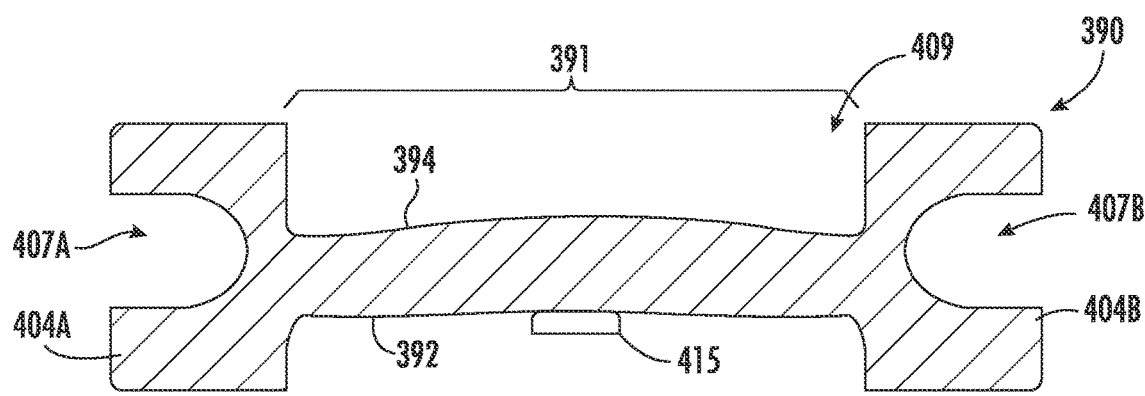
FIG. 15B shows the same items and view of FIG. 15A, but with the medial portion pressed upward to flex the upper surface into a non-linear (e.g., curved) configuration.

FIG. 15A is a simplified front cross-sectional view of a multi-fiber ferrule 390 having a medial portion 391 of a non-constant thickness (being thickest at a center thereof) positioned between thicker lateral portions 404A-404B that define recesses 407A-407B for receiving alignment pins (not shown). Although no grooves are illustrated in the medial portion 391, it is to be appreciated that an operative ferrule 390 would include an array of grooves defined in an upper surface 394 of the medial portion 391 such as shown in previous embodiments herein. As shown, the upper surface 394 of the medial portion 391 is in a linear (flat) configuration, and the lower surface 392 of the medial portion 391 is in a non-linear (curved) configuration, when the medial portion 391 is in a non-flexed state. A shim 415 is positioned below a center of the lower surface 392 in preparation for deflecting the medial portion 391 upward. FIG. 15B shows the same ferrule 390 and shim 415 as depicted in FIG. 15A, but with the medial portion 391 pressed upward by the shim 415 to flex the upper surface 394 into a non-linear (e.g., curved) configuration resembling a shallow circular arc (wherein in certain embodiments the lower surface 392 can also be flexed into a linear configuration). Such configuration of the upper surface 394 may allow optical fiber segments to be loaded into grooves, assuming grooves (not shown) are arranged in the upper surface 394.

Figure 16:
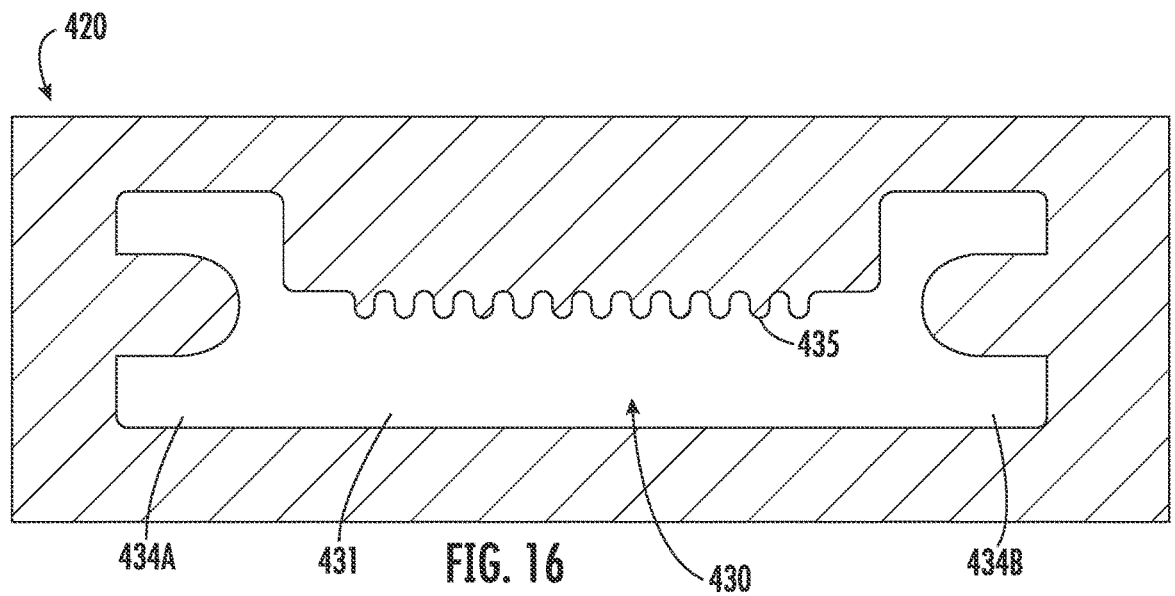
FIG. 16 is a cross-sectional view of an extrusion die for producing a multi-fiber ferrule of a connector according to one embodiment of the present disclosure.

Various methods for producing a multi-fiber ferrule have been described previously herein. In certain embodiments, a multi-fiber ferrule may be produced by extrusion using an extrusion die. FIG. 16 is a cross-sectional view of an extrusion die 420 for producing a multi-fiber ferrule of a connector according to one embodiment of the present disclosure. The extrusion die 420 defines a cavity 430 having a medial cavity portion 431 and a groove-defining upper surface 435 for producing a medial portion of a ferrule, with the cavity further including thicker lateral cavity portions 434A-434B for producing lateral portions of a ferrule.

Figure 17:
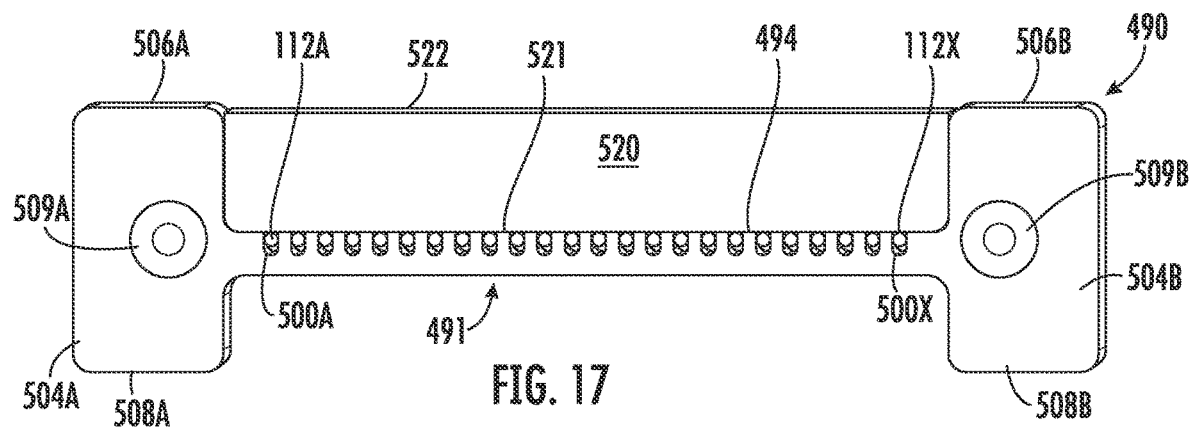
FIG. 17 is a perspective view of an array of optical fibers arranged within an array of grooves defined in an upper surface of a medial portion of a multi-fiber ferrule useable in a connector according to one embodiment of the present disclosure, with a reference block being positioned above the medial portion and between lateral portions of the multi-fiber ferrule, and with alignment pins extending through apertures defined in the lateral portions.

Although various embodiments disclosed herein have included ferrules suitable for receiving twelve optical fiber segments, it is to be appreciated that a multi-fiber ferrule may define any suitable number of grooves (e.g., 8, 12, 24, or some other number) for receiving a like number of optical fiber segments. FIG. 17 is a perspective view of an array of twenty-four optical fiber segments 112A-112X arranged within an array of grooves 500A-500X defined in an upper surface 494 of a medial portion 491 of a multi-fiber ferrule 490 useable in a connector according to one embodiment.

The medial portion 491 is arranged between increased thickness lateral portions 504A-504B each having a corresponding alignment pin 509A-509B extending therethrough, with the alignment pins 509A-509B being arranged substantially coplanar with the array of optical fibers 112A-112X. The lateral portions 504A-504B extend between upper surfaces 506A-506B and lower surfaces 508A-508B that are non-coplanar with the medial portion 491. A reference block 520 is positioned in a recess above the medial portion 491 and between the lateral portions 504A-504B of the multi-fiber ferrule 490, with a lower surface 521 of the reference block 520 arranged in contact with the upper surface 494 of the medial portion 491 as well as the optical fiber segments 112A-112X received in the grooves 500A-500X. In certain embodiments, an upper surface 522 of the reference block 520 may be arranged substantially coplanar with the upper surfaces 506A-506B of the lateral portions 504A-504B of the multi-fiber ferrule 490, to permit the multi-fiber ferrule 490 to be used as part of an otherwise known connector assembly (e.g., in the connector 10 shown in FIG. 1). In certain embodiments, a multi-fiber ferrule of one connector may be arranged to couple optical fiber segments with corresponding optical fiber segments supported by a multi-fiber ferrule of another connector.

FIG. 18A is a perspective view of a first multi-fiber ferrule 590 useable in a connector according to one embodiment of the present disclosure, with alignment pins 609A-609B (each having an associated pin keeper 610A-610B) extending through apertures defined in lateral portions 604A-604B of the first multi-fiber ferrule 590. A medial portion 591 of the first multi-fiber ferrule 590 is positioned between the lateral portions 604A-604B and define an array of grooves in an upper surface 592 of the medial portion 591 for receiving a first array of optical fiber segments (not shown), with the grooves extending continuously from a front (or proximal) end 601 to a rear (or distal) end 602 of the first multi-fiber ferrule 590. FIG. 18B is a perspective view of the first multi-fiber ferrule 590 and alignment pins 609A-690B of FIG. 18A, with the alignment pins 609A-609B further extending through apertures defined through lateral portions 604A'-604B' of a second multiple-fiber ferrule 590' that includes a medial portion 591' defining an array of grooves in an upper surface 592' (extending from a front end 601' to a rear end 602') for supporting a second array of optical fiber segments (not shown). FIG. 18B shows the ferrules 590, 590' arranged in a "key-up to key-up" configuration, so that a light signal from one numbered optical fiber (e.g., a first optical fiber) associated with the first multi-fiber ferrule 590 is transmitted to a differently numbered optical fiber (e.g., a twelfth optical fiber) associated with the second multi-fiber ferrule 590'. In certain embodiments, the ferrules 590', 590' may be arranged in a "key-up to key-down" configuration so that light from a first numbered optical fiber associated with the first multi-fiber ferrule 590 is transmitted to a correspondingly numbered optical fiber associated with the second multi-fiber ferrule 590'. In certain embodiments, the front or proximal ends 601, 601' of the multi-fiber ferrules 590, 590' may be arranged perpendicular to the upper surfaces 592, 592'. In certain embodiments, the front or proximal ends 601, 601' of the multi-fiber ferrules 590, 590' may be non-perpendicular to the upper surfaces 592, 592', such as at an angle of 8 to 9 degrees away from perpendicular to the upper surfaces 592, 592' to permit optical fibers associated with the multi-fiber ferrules 590, 590' to be polished to the same angle at the front or proximal ends 601, 601' of the multi-fiber ferrules 590, 590' in order to reduce back-reflection of optical signals between mated optical fiber ends. In certain embodiments, the front or proximal ends 601, 601' of the multi-fiber ferrules 590, 590' may be non-perpendicular to the upper surfaces 592, 592' at the same or complementary angles to permit the multi-fiber ferrules 590, 590' to be arranged in a key-up to key-down configuration, or alternatively in a key-up to key-up configuration.

Figure 19:
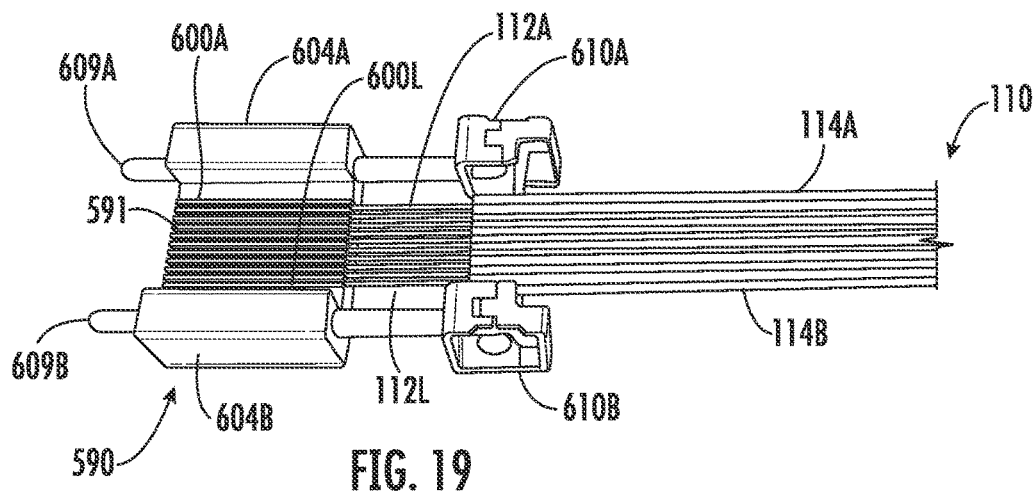
FIG. 19 is a perspective view of the first multi-fiber ferrule and alignment pins of FIG. 18A, with uncoated portions of an array of optical fibers received in an array of grooves defined in a medial portion of the multi-fiber ferrule.

FIG. 19 is a perspective view of the first multi-fiber ferrule and alignment pins of FIG. 18A, showing grooves 600A-600L of the medial portion 591 having received therein uncoated optical fiber segments 112A-112L that extend from corresponding coated optical fiber segments 114A-114B of an optical fiber array 110. The optical fiber array 110 extends generally between the alignment pin keepers 610A-610B associated with alignment pins that may be used as retaining and alignment structures within and between multi-fiber connectors.

In certain embodiments, a medial portion of a multi-fiber ferrule may first and second parallel rows of grooves for receiving first and second arrays of optical fibers, resulting in a two-dimensional array. For example, in certain embodiments, a medial portion of a multi-fiber ferrule may include an upper surface defining a first array of grooves for receiving a first array of optical fibers, and may include a lower surface defining a second array of grooves for receiving a second array of optical fibers. The respective arrays of optical fibers may be retained in the corresponding arrays of grooves with an adhesive material and/or first and second reference blocks, optionally embodied in a groove covering blocks that are part of a final assembly, remaining positioned against portions of the multi-fiber ferrule as part of a multi-fiber connector.

Figure 20:
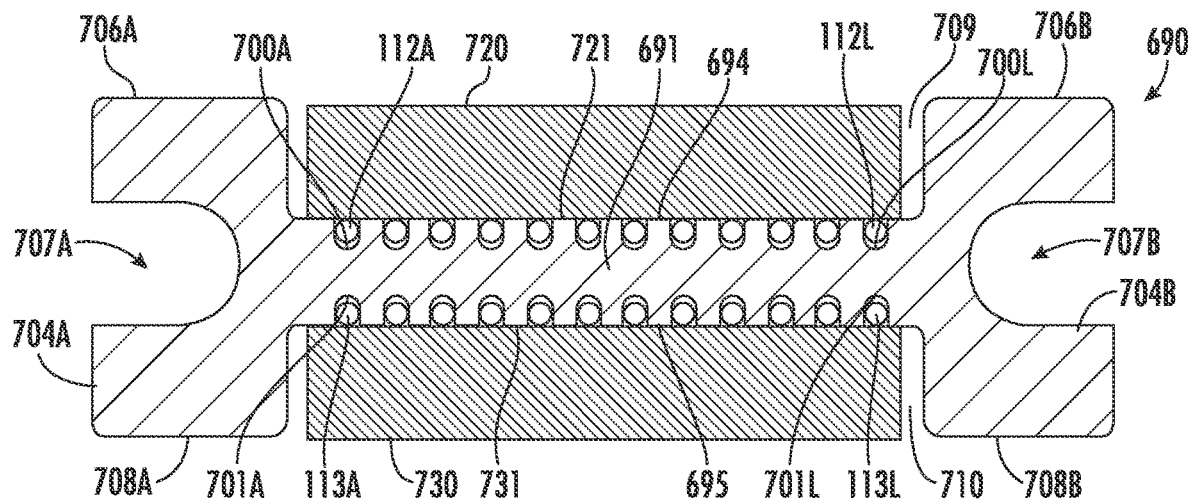
FIG. 20 is a front cross-sectional view of a multi-fiber ferrule including a medial portion having a first array of grooves defined in an upper surface thereof and having a second array of grooves defined in a lower surface thereof, with a first array of optical fibers received in the first array of grooves and positioned against a first reference block, and with a second array of optical fibers received in the second array of grooves and positioned against a second reference block.

FIG. 20 is a front cross-sectional view of a multi-fiber ferrule 690 including a medial portion 691 having a first array of grooves 700A-700L defined in an upper surface 694 of the medial portion 691, and having a second array of grooves 701A-701L defined in a lower surface 695 of the medial portion 691. The medial portion 691 is arranged between thicker lateral portions 704A-704B, which have upper surfaces 706A, 706B and lower surfaces 708A, 708B, and which define recesses 707A, 707B for receiving alignment pins (not shown). An upper cavity 709 is provided above the upper surface 694 and between the thicker lateral portions 704A-704B, and a lower cavity 710 is provided below the lower surface 695 and between the thicker lateral portions 704A-704B. A first array of optical fibers 112A-112L is received in the first array of grooves 700A-700L and positioned against a lower surface 721 of a first reference block 720 arranged in the upper cavity 709, and a second array of optical fibers 113A-113L is received in the second array of grooves 701A-701L and positioned against an upper surface 731 of a second reference block 730 arranged in the lower cavity 710. In certain embodiments, the arrays of optical fibers 112A-112L, 113A-113L may have the same pitch and spacing as optical fibers of a conventional MPO connector.

In certain embodiments, a multi-fiber connector comprises a first array of optical fibers each having a first uncoated segment that has a first diameter and that has a first outer surface, a second array of optical fibers each having a second uncoated segment that has a second diameter and that has a second outer surface, and a multi-fiber ferrule defining a first array of grooves that are recessed relative to an upper surface of a medial portion of the multi-fiber ferrule and defining a second array of grooves that are recessed relative to a lower surface of the medial portion. Each groove of the first array of grooves has a first maximum depth that is greater than the first diameter, and each groove of the second array of grooves has a second maximum depth that is greater than the second diameter. Each optical fiber of the first array of optical fibers comprises a non-contacting portion of the first outer surface that is devoid of contact with the first array of grooves, and the non-contacting portion comprises an arc of at least 120 degrees and that is centered at a horizontal tangent of a lowermost boundary of the first outer surface. Likewise, each optical fiber of the second array of optical fibers comprises a non-contacting portion of the second outer surface that is devoid of contact with the second array of grooves, and the non-contacting portion comprises an arc of at least 120 degrees and that is centered at a horizontal tangent of an uppermost boundary of the second outer surface.

In certain embodiments, an array of optical fibers (optionally provided in a ribbon) may be prepared for inclusion in a connector by stripping ends of the optical fibers to produce uncoated fiber segments, with unstripped portions of the same optical fibers embodying coated fiber segments that embody continuous extensions of the uncoated fiber segments. The uncoated fiber ends may then be cleaned according to conventional cleaning steps. A medial portion of a multi-fiber ferrule as disclosed herein may flexed into a non-linear configuration, thereby expanding an average width of at least some grooves defined therein, and the uncoated fiber segments may be inserted into the grooves. Ends of the uncoated fiber segments may extend beyond the grooves. Optionally, adhesive material may be provided in the grooves and/or around an exterior of the uncoated fiber segments when the uncoated fiber segments are inserted into the grooves. After insertion of the uncoated fiber segments into the grooves, a reference block is positioned proximate to a surface of the medial portion defining the grooves, and the uncoated fiber ends are pressed away from troughs of the grooves (e.g., in an upward direction) to contact a surface of the reference block. The medial portion of the reference block may then be unflexed (or flexed in a direction opposing the initial flexure) to cause substantially the entire medial portion of the ferrule to contact a surface of the reference block, so that the uncoated fiber segments are linearly aligned by contact with the surface of the reference block. If the reference block is to be maintained as part of a final assembled connector, the reference block may be retained in or against the ferrule with an adhesive material and/or a securing clip. End portions of the uncoated fiber segments extending beyond the medial portion of the multi-fiber ferrule may be cleaved and polished flush with a surface of the multi-fiber ferrule. Thereafter, the multi-fiber ferrule with arrayed optical fibers retained therein may be incorporated into a multi-fiber connector, such as (but not limited to) the type shown in FIGS. 1-2.

In certain embodiments, the steps of flexing a medial portion of a multi-fiber ferrule into a non-planar configuration, and returning the medial portion of a ferrule to a planar configuration, may be omitted when grooves defined in the ferrule have appropriately tapered walls.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred. Moreover, where a method claim below does not explicitly recite a step mentioned in the description above, it should not be assumed that the step is required by the claim.

What is claimed is:

1. A multi-fiber connector comprising:
   an array of optical fibers each having a first uncoated segment that has a first diameter and that has a first outer surface;
   a multi-fiber ferrule comprising a medial portion defining an array of grooves that are recessed relative to an upper surface of the medial portion of the multi-fiber ferrule, wherein each groove of the array of grooves has a first maximum depth that is greater than the first diameter;
   wherein the array of optical fibers is received within the array of grooves, with the first uncoated segment of each optical fiber positioned in a corresponding groove of the array of grooves; and
   wherein, when the multi-fiber ferrule is oriented with the upper surface facing upward, each optical fiber comprises a non-contacting portion of the first outer surface that is devoid of contact with the array of grooves, and the non-contacting portion comprises an arc of at least 120 degrees and that is centered at a horizontal tangent of a lowermost boundary of the first outer surface;
   wherein:
   each optical fiber of the array of optical fibers has a second coated segment that has a second diameter;
   the medial portion of the multi-fiber ferrule further defines an array of groove extensions that are recessed relative to the upper surface, wherein each groove extension of the array of groove extensions embodies an extension of a corresponding groove of the array of grooves; and
   each second coated segment is received within a respective groove extension of the array of groove extensions.

2. The multi-fiber connector of claim 1, wherein, when the multi-fiber connector is oriented with the upper surface of the medial portion facing upward, a horizontal tangent of an uppermost boundary of the first outer surface of each optical fiber is substantially registered with the upper surface.

3. The multi-fiber connector of claim 1, comprising adhesive material arranged between the array of optical fibers and the array of grooves.

4. The multi-fiber connector of claim 1, wherein each groove of the array of grooves comprises a substantially U-shaped groove.

5. The multi-fiber connector of claim 4, wherein substantially vertical portions of each groove of the array of grooves are oriented no more than 3 degrees away from vertical.

6. The multi-fiber connector of claim 1, wherein the non-contacting portion comprises an arc of at least 150 degrees and that is centered at a horizontal tangent of a lowermost boundary of the first outer surface.

7. The multi-fiber connector of claim 1, wherein:
   the medial portion spans between first and second lateral portions of the multi-fiber ferrule;

the first and second lateral portions each comprise a thickness that is greater than a maximum thickness of the medial portion; and the first and second lateral portions respectively define first and second apertures configured to receive alignment pins of the multi-fiber connector.

8. The multi-fiber connector of claim 7, wherein the array of grooves consists of a one-dimensional array, and the first and second apertures are collinearly arranged with the array of grooves.

9. The multi-fiber connector of claim 1, wherein the medial portion comprises a non-uniform thickness that is greater at a central region of the medial portion than at non-central regions of the medial portion.

10. The multi-fiber connector of claim 1, further comprising a groove covering block arranged over the upper surface of the multi-fiber ferrule, with first uncoated segments of the array of optical fibers being arranged between array of grooves and the groove covering block.

11. The multi-fiber connector of claim 1, wherein the array of optical fibers embodies a first array of optical fibers and the array of grooves embodies a first array of grooves, and the multi-fiber ferrule further comprises:

a second array of optical fibers each having a second uncoated segment that has a second diameter and that has a second outer surface a second array of grooves that are recessed relative to a lower surface of the medial portion of the multi-fiber ferrule, wherein each groove of the second array of grooves has a second maximum depth that is greater than the second diameter;

wherein the second array of optical fibers is received within the second array of grooves, with the second uncoated segment of each optical fiber of the second array of optical fibers positioned in a corresponding groove of the second array of grooves; and wherein, when the multi-fiber ferrule is oriented with the lower surface facing downward, each optical fiber of the second array of optical fibers comprises a non-contacting portion of the second outer surface that is devoid of contact with the second array of grooves, and the non-contacting portion comprises an arc of at least 120 degrees and that is centered at a horizontal tangent of an uppermost boundary of the second outer surface.

12. A method for fabricating a multi-fiber connector that includes a ferrule having a medial portion spanning between first and second lateral portions each comprising a thickness greater than a maximum thickness of the medial portion, the medial portion defining an array of grooves that are recessed relative to an upper surface of the medial portion, the method comprising:

causing flexure of the medial portion to arrange the upper surface in a non-linear configuration, thereby expanding an average width of at least some grooves of the array of grooves;

receiving an array of optical fibers within the grooves when the upper surface is arranged in the non-linear configuration, with a first uncoated segment of each optical fiber positioned in a corresponding groove of the array of grooves, and with each first uncoated segment having a first diameter and a first outer surface;

pushing the array of optical fibers in a direction perpendicular to the upper surface and away from a bottom of each groove of the array of grooves, to cause the array of optical fibers to contact a surface of a reference block positioned adjacent to the upper surface; and securing the first uncoated segments of the array of optical fibers within the array of grooves.

13. The method of claim 12, wherein, when the multi-fiber ferrule is oriented with the upper surface of the medial portion facing upward, each optical fiber comprises a non-contacting portion of the first outer surface that is devoid of contact with the array of grooves, and the non-contacting portion comprises an arc of at least 120 degrees and that is centered at a horizontal tangent of a lowermost boundary of the first outer surface.

14. The method of claim 12, wherein the securing of the first uncoated segments of the array of optical fibers within the array of grooves comprises securement with an adhesive.

15. The method of claim 12, further comprising removing the reference block from being positioned adjacent to the upper surface.

16. The method of claim 12, wherein the reference block comprises a groove covering block, and the method further comprises maintaining contact between the groove covering block within the multi-fiber connector.

17. The method of claim 12, wherein the pushing of the array of optical fibers comprises pushing with a translatable element arranged external to the ferrule.

18. The method of claim 12, wherein upon securing of the first uncoated segments of the array of optical fibers within the array of grooves, when the multi-fiber connector is oriented with the upper surface of the medial portion facing upward, a horizontal tangent of an uppermost boundary of the first outer surface of each optical fiber is substantially registered with the upper surface of the medial portion.

19. The method of claim 12, wherein the medial portion comprises a non-uniform thickness that is greater at a central region of the medial portion than at non-central regions of the medial portion.

20. The method of claim 12, wherein:

each optical fiber of the array of optical fibers has a second coated segment that has a second diameter;

the medial portion of the multi-fiber ferrule further defines an array of groove extensions that are recessed relative to the upper surface of the medial portion, wherein each groove extension of the array of groove extensions embodies an extension of a corresponding groove of the array of grooves; and the method further comprises receive each second coated segment within a respective groove extension of the array of groove extensions.

* * * * *